(12) United States Patent
So et al.

(10) Patent No.: US 12,497,550 B2
(45) Date of Patent: Dec. 16, 2025

(54) UNDERWATER ADHESIVES FORMED BY AGGREGATION OF FREE PROTEINS INTO AMYLOID MATERIALS

(71) Applicant: The Government of the United States of America, as represented by the Secretary of the Navy, Arlington, VA (US)

(72) Inventors: Christopher R. So, Alexandria, VA (US); Michael C. Wilson, Alexandria, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 176 days.

(21) Appl. No.: 18/368,841

(22) Filed: Sep. 15, 2023

(65) Prior Publication Data
US 2024/0093076 A1 Mar. 21, 2024

Related U.S. Application Data
(60) Provisional application No. 63/407,414, filed on Sep. 16, 2022.

(51) Int. Cl.
*C09J 189/00* (2006.01)
*C09J 11/06* (2006.01)

(52) U.S. Cl.
CPC ............ *C09J 189/00* (2013.01); *C09J 11/06* (2013.01); *C09J 2203/35* (2020.08); *C09J 2301/408* (2020.08)

(58) Field of Classification Search
CPC ............................... C09J 11/06; C09J 2203/35
See application file for complete search history.

(56) References Cited

U.S. PATENT DOCUMENTS

| 7,057,019 | B2 | 6/2006 | Pathak |
| 10,927,148 | B2 | 2/2021 | So et al. |
| 2008/0287635 | A1 | 11/2008 | Sun |
| 2012/0183794 | A1* | 7/2012 | Guo ................... C08G 18/6212 428/479.6 |
| 2014/0363614 | A1 | 12/2014 | Blomgreen et al. |
| 2017/0015885 | A1* | 1/2017 | Liu ........................... C07K 7/06 |
| 2019/0249050 | A1 | 8/2019 | Wilker et al. |

FOREIGN PATENT DOCUMENTS

| CN | 106905919 A | 6/2017 |
| WO | 2012-134281 A2 | 10/2012 |

OTHER PUBLICATIONS

M.J. Brennan et al. Biomaterials 124 (2017) 116e125.
International Search Report, dated Jan. 10, 2024, for counterpart application PCT/US2023/032878.
International Preliminary Report on Patentability and Written Opinion, dated Jan. 10, 2024, for counterpart application PCT/US2023/032878.

* cited by examiner

*Primary Examiner* — Daniel McNally
(74) *Attorney, Agent, or Firm* — US Naval Research Laboratory; Fariborz Moazzam

(57) ABSTRACT

Adhesive formulations comprising bovine serum albumin, b-lactoglobulin, and/or a-lactalbumin can be applied and cured underwater to form a strong adhesive. Curing can be accomplished using heat or via a chemical denaturing component.

3 Claims, 10 Drawing Sheets

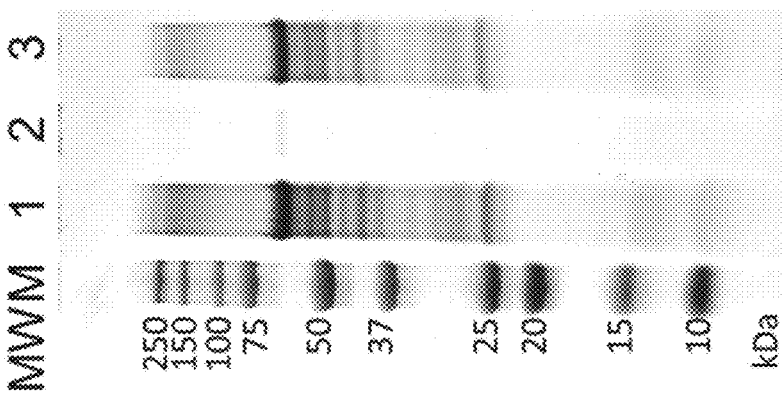
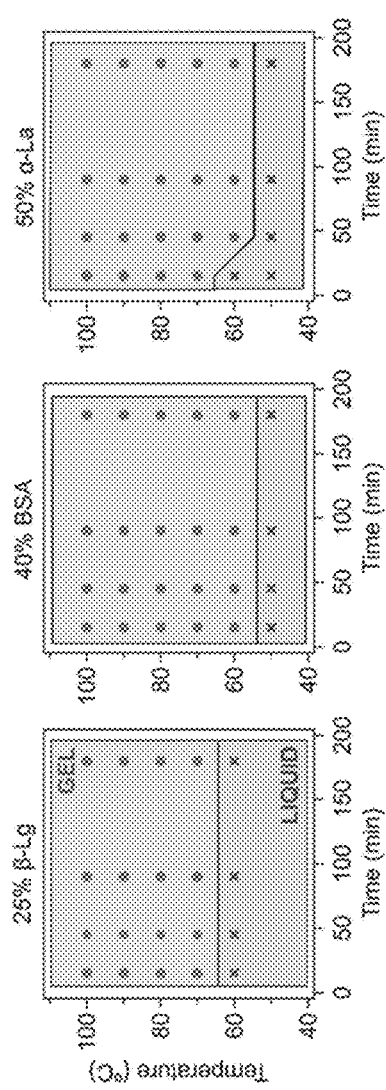
FIG. 2A
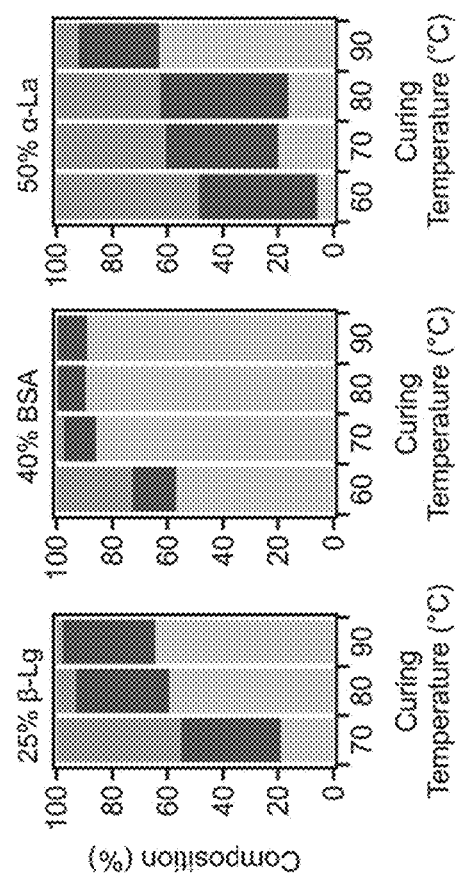
FIG. 2B
FIG. 2C

| Formulation | [Urea] | BAC (% w/v) | Silica (% w/v) | Condition | Adhesion Strength (MPa) |
|---|---|---|---|---|---|
| 1 | 4M | 5% | 0% | Dry | 0.76 ± 0.13 |
|   |    |    |    | ASW | 0.23 ± 0.13 |
| 2 | 6M | 5% | 0% | Dry | 0.93 ± 0.13 |
|   |    |    |    | ASW | 0.26 ± 0.03 |
| 3 | 10M | 5% | 0% | Dry | 0.61 ± 0.04 |
|   |    |    |    | ASW | 0.16 ± 0.03 |
| 4 | 6M | 5% | 15% | Dry | 0.09 ± 0.07 |
|   |    |    |    | ASW | 0.00 ± 0.00 |
| 5 | 6M | 5% | 30% | Dry | 0.25 ± 0.12 |
|   |    |    |    | ASW | 0.07 ± 0.03 |
| 6 | 6M | 7.5% | 0% | Dry | 0.50 ± 0.06 |
|   |    |    |    | ASW | 0.15 ± 0.02 |
| 7 | 6M | 10% | 0% | Dry | 0.72 ± 0.05 |
|   |    |    |    | ASW | 0.15 ± 0.02 |
| 8 | 6M | 15% | 0% | Dry | 0.61 ± 0.03 |
|   |    |    |    | ASW | 0.15 ± 0.05 |
| 9 | 6M | 15% | 15% | Dry | 0.45 ± 0.09 |
|   |    |    |    | ASW | 0.15 ± 0.01 |
| 10 | 6M | 15% | 30% | Dry | 0.29 ± 0.14 |
|    |    |    |    | ASW | 0.10 ± 0.03 |
| 11 | 6M | 15% | 45% | Dry | 0.88 ± 0.08 |
|    |    |    |    | ASW | 0.17 ± 0.01 |
| 12 | 8M | 15% | 30% | Dry | 0.30 ± 0.04 |
|    |    |    |    | ASW | 0.11 ± 0.01 |
| 13 | 10M | 15% | 30% | Dry | 0.18 ± 0.06 |
|    |    |    |    | ASW | 0.04 ± 0.02 |

FIG. 10

UNDERWATER ADHESIVES FORMED BY AGGREGATION OF FREE PROTEINS INTO AMYLOID MATERIALS

CROSS-REFERENCE TO RELATED APPLICATIONS

This application claims the benefit of U.S. Provisional Application 63/407,414 filed on Sep. 16, 2023, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing NC 210316.

BACKGROUND

Adhesion in wet environments affects technologies across disciplines, e.g. in medicine, maritime activities, transportation, and agriculture. In spite of this, wet conditions challenge many adhesives. In recent years, researchers have looked to nature to find methods to improve underwater adhesion. Many natural solutions to wet adhesion involve proteins and their aggregation into materials that are structured across length scales. Some organisms use unique chemistries to achieve underwater adhesion, notably modified amino acid chemistries such as catechol[1] and phosphorylation.[2] Spiders use organic salts to sequester interfacial water to make wet adhesive silks.[3] Adhesive produced by the sandcastle worm relies on complex coacervation to deliver and cure water-soluble materials.[4] Survival of bacterial biofilms, expansion of fungi, and the attachment of barnacles all rely on amyloid-like materials that adhere in wet conditions.[5-7] While some of these strategies have been realized in model systems, many others remain underdeveloped as technologies. For instance, amyloid-like materials have not been widely produced for underwater adhesives,[8] despite their biological use across taxa—in Bacteria, Fungi, and Animalia.

Structured protein materials such as those used by barnacles employ hydrogen bonds to tightly fold proteins and display side chains for enhanced mechanical strength, protein bundling, and co-localized reactive chemistries. The polymerization of barnacle glue occurs through these molecular interactions, and the resulting adhesive is a meshwork of nanoscale fibers. Proteins that can form amyloids exhibit properties that are beneficial for underwater adhesion; they produce high stiffness materials, phase-change upon activation by environmental conditions, and are highly insoluble. Specifically, Knowles et al. recently demonstrated amyloid materials can be processed to form ordered bulk films with moduli of 5-7 GPa, rivaling films made from rigid carbon nanotubes, and consistent with the modulus of a single amyloid nanofiber.[9] These, and many other properties, have been used in technical applications. Amyloid-like materials have been used in separation science, coatings, catalysis, drug delivery, mechanical actuation, and many other areas.[10-15]

To date, efforts to create economical, protein-based water-curable adhesives have struggled to achieve success.[27] See, e.g., Brennan et al., Biomaterials 2017 April; 124:116-125, paragraph spanning pp. 121-122. A need exists for new approaches for underwater adhesion.

BRIEF SUMMARY

In a first embodiment, an adhesive formulation suitable underwater adhesion comprises between 25 and 100% w/v (weight/volume) bovine serum albumin, b-lactoglobulin, and/or a-lactalbumin in water. In another aspect of the first embodiment, other protein isolates/concentrates from plants or animals could be used in place of or in addition to the albumin—examples include one or more of soy protein isolate, pea protein concentrate, whey protein isolate, and wheat gluten.

Another embodiment comprises applying, underwater, a formulation of the first embodiment to a first surface, contacting the formulation with a second surface (also while underwater), and curing the formulation, thereby forming an adhesive bond between the two surfaces while underwater. The curing can be chemical, via the application of component that initiates denaturation and aggregation, or through heating the formulation to a temperature of at least 60° C. (for example, the heating can be to about 90° C.). Optionally, the process of forming the adhesive bond can take place at a waterline or away from water.

In a further embodiment, an adhesive formulation suitable for chemical curing comprises two components: a first component comprising a formulation of the first embodiment, and a second component comprising 6-10M of a protein denaturant such as urea, 0.8-1.2M cysteine or other sulfur-containing reducing agent, 5-15% w/v of charged surfactant such as benzalkonium chloride, and 10-45% w/v hard filler material such as silica gel or sand. The two components are used in volumetric ratio in the range of 0.5:2 to 2:0.5 (for example, 1:1). Similarly, this formulation can applied and cured underwater.

In further aspects, any of the above formulations can be free of additional crosslinking agents.

BRIEF DESCRIPTION OF THE DRAWINGS

FIG. 2A shows the phase of β-Lg solutions of 25%, BSA solutions of 40% (w/v) and α-La solutions of 50% (w/v) heated at different temperatures and times. Blue circles represent gel and yellowxs represent liquid, as determined by inversion. FIG. 2C shows liquid expelled on top of a gel during gelation. FIG. 2D depicts Thioflavin T (ThT) fluorescence of β-Lg at 25% (w/v), heated at 90° C. for 90 min Phase of α-La solutions of 50% (w/v) heated at different temperatures and times. FIG. 2B shows the composition of β-Lg, BSA, and α-La gels cured at different temperatures. FIG. 2C is an example SDS-PAGE gel for 30% BSA. Lane 1: 90° C. curing Laemmli-soluble fraction, Lane 2: 90° C. curing water-soluble fraction, Lane 3: BSA monomer control, Lane 4: Molecular weight ladder FIG. 3A shows the composition of gels based on solubility in water or Laemmli buffer. FIG. 3B shows wet adhesion strength after accelerated degradation (12 days in water; 8 hr. in 65° C. water) normalized by short-term wet adhesion strength. Error bars indicate propagated standard error.

FIG. 5C is an example of gel formation after deposition of protein solution mixed with curing agent in artificial seawater.

FIG. 7A shows the deposition of adhesive in ASW onto sanded aluminum using two-chamber adhesive gun. FIG. 7A demonstrates adhesive strength holding 110 lbs. (50 kg) after 4 days curing submerged in seawater. Rightmost image shows close-up of bond with a 3"×1" (7.6 cm×2.54 cm) overlap

The table in FIG. 10 shows curing agent composition and its effect on wet and dry adhesion on un-sanded aluminum. BAC is benzalkonium chloride. All adhesives are made using 80% (w/v) BSA with 6 wt % glycerol. The curing agent contains 1M L-cys and the three components in the table. Error indicates standard error.

DETAILED DESCRIPTION

Definitions

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

Overview

As described herein, amyloid materials formed from free protein solutions through chemical triggering and heat denaturation create adhesive materials operable in dry and wet conditions. These techniques act to rapidly cure proteins in place between two adherends using a steam cure technique, formulations and conditions that maximize conversion into amyloids, and their ability to operate as robust underwater adhesives. Highly converted materials demonstrate enhanced adhesive strength underwater. By applying simple heat and chemical triggering, protein adhesives can attain dry bond strengths of up to 3 MPa and wet bond strengths of 0.5-1.0 MPa after being submerged underwater for extended periods of time while free proteins and dry cured samples exhibit little to no adhesion. These methods can be applied to a wide range of proteins to enhance their underwater adhesion.

Phase changing proteins, with an ability to switch biophysical states upon exposure to chemical or external triggers such as heat, are stable in water but can transition rapidly into viscous liquids, rubbery hydrogels, or rigid solids. Initiated by protein unfolding, structural transitions are irreversible and result in the production of insoluble amyloid fibers. Materials that operate as underwater adhesives preferably possess the abilities to: (1) rapidly cure in place, (2) bind to and displace water from surfaces, and (3) maintain high cohesion and insolubility in water once cured.

Figure 1:
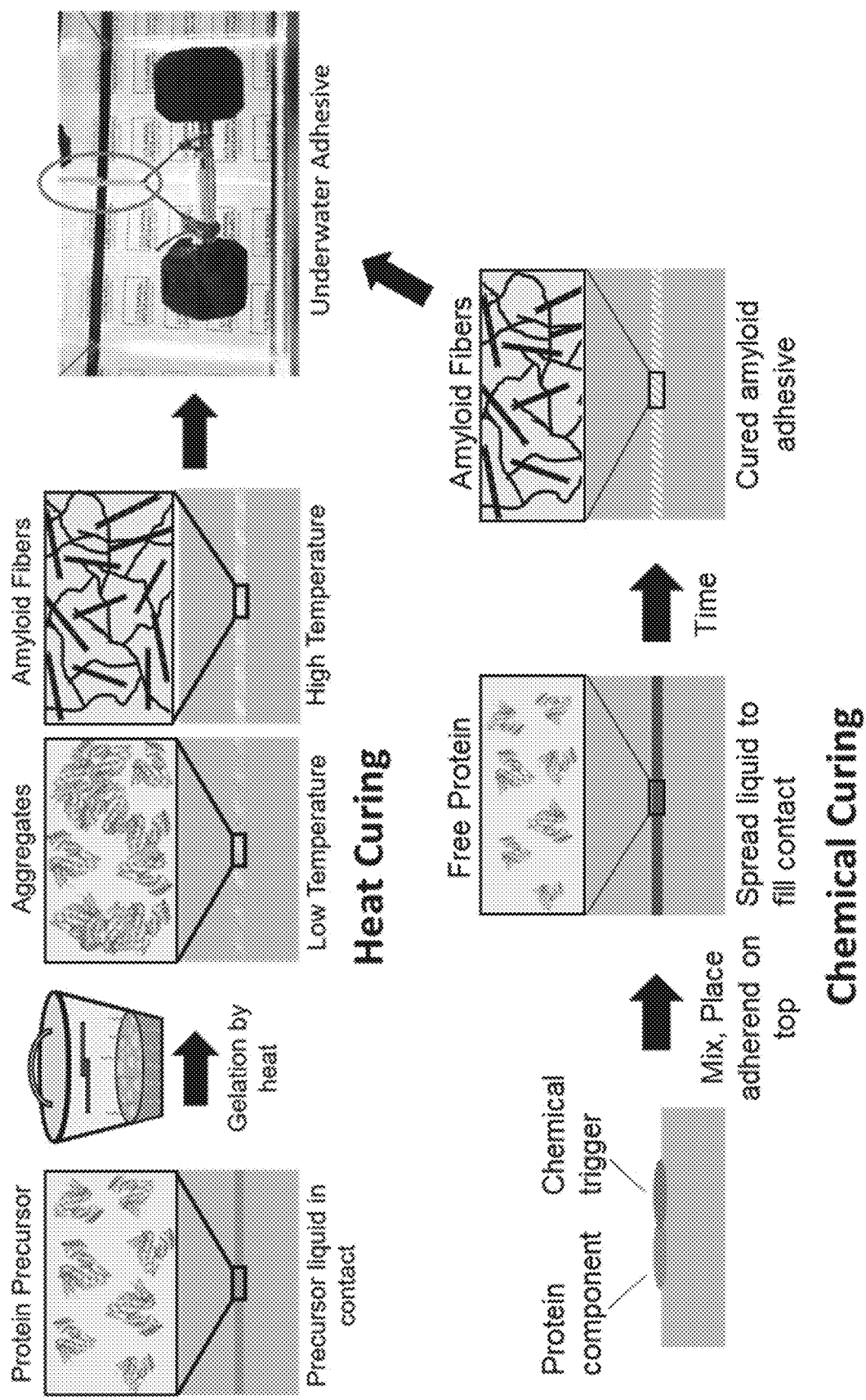
FIG. 1 shows how a steam curing process (forming adhesives from non-amyloid aggregates at low temperature and amyloid-based adhesives at high temperature) while a chemical curing process (involving mixing of two components to cure the protein into an underwater adhesive) both create strong underwater adhesives FIGS. 2A to 2C relate to the use of β-Lactoglobulin (β-Lg), α-Lactalbumin (α-La), and Bovine Serum Albumin (BSA).

Certain proteins than can be found in food, including β-Lactoglobulin (β-Lg), α-Lactalbumin (α-La), and Bovine Serum Albumin (BSA), can be used to form adhesives (FIG. 1). Commonplace whey isolate proteins (Serum Albumin, β-Lactoglobulin, α-Lactalbumin, and mixtures thereof) derived from the dairy industry maintain high irreversible affinity towards a wide variety of surface materials, can form amyloids[16-18], and have been commercially developed into solids as coatings and carriers in drug delivery, food packaging, and medical devices.

These proteins are the major constituents of whey protein and are byproducts of processes in the dairy industry.[19] Their low cost, abundance, and industrial use make them ideal for materials development. BSA and whey protein have been previously examined with various crosslinkers for potential use as adhesives, and have shown varying degrees of success as dry adhesives.[20-24] In a pure protein system, it was hypothesized that the beta-sheet structure of BSA helps improve its adhesion.[23] Additionally, these proteins quickly form gels at high concentration through a variety of mechanisms.[25] These properties impart rapid setting of the proteins, and highlights their ability to form solid materials in water. Conversion of proteins from monomers, to oligomers, and ultimately to organized amyloid fibers (i.e., control over their biophysical state) also define the ultimate mechanical properties of the material.

These proteins exhibit properties ideal as underwater adhesives, however, curing them in place and optimizing their conversion into insoluble materials is not believed to have been previously described.

EXAMPLES

Protein Solution Preparation. The proteins (β-Lactoglobulin (β-Lg), α-Lactalbumin (α-La), and Bovine Serum Albumin (BSA)) were used as is from the manufacturer with no further purification. Concentration was varied from 50 mg/mL to 500 mg/mL (labeled as 5% w/v to 50% w/v). The protein was dissolved in ultrapure water by end-over-end rotation at 10-30 rpm or by vortex mixing until visibly dissolved. Samples were used within 48 hours of mixing. For gelation experiments, Thioflavin T was added to a final concentration of 250 µM concentration.

Protein Gel Preparation. A range of solution concentrations were produced for each protein (β-Lg: 25% w/v, 20%, 15%, 10%, 5%; α-La: 50%, 40%, 30%, 20%, 10%, 5%; BSA: 40%, 30%, 20%, 10%, 5%). Samples of 400 µL were placed in 1.5 mL Eppendorf tubes and heated in a programmable heating block at temperatures from 50-100° C. for 15-180 min. Gelation was considered from inversion of the Eppendorf tube, where a liquid would flow, but a gel would remain at the end of the tube.

Amyloid Content Determination. The heated protein solutions were examined using fluorescence microscopy. As Thioflavin T exhibits a shift in emission wavelength as a function of frequency, we used its fluorescence at 480 nm to confirm the presence of amyloid-like fibrils. The fraction of soluble and insoluble content was further examined by SDS-PAGE. Gels of 20 µL were produced and extracted by two methods: 1) soaking in water and 2) a heat treatment in Laemmli buffer (1 hr at 95 C in the presence of SDS and 1-mercaptoethanol). Free protein was extracted by soaking cured materials in water for two days, while less soluble materials were extracted by exposing materials to Laemmli buffer at 95 C for 1 hr. All solutions were diluted to normalize for changes in volume and concentration for comparison by PAGE. Gel Electrophoresis was performed using pre-cast polyacrylamide gels (Bio-Rad) at a fixed voltage of 200V for 30 mins. Gels were stained with Coomassie blue and imaged using a gel imager (Bio-Rad Chemidoc). The abundance of insoluble material was assessed using ImageJ by integration of intensity from each free protein band. Bands from water soaked samples were considered free unconverted protein, while heat treated samples in Laemmli buffer were considered to be oligomeric protein aggregates of lower solubility. The remaining fraction was considered insoluble and amyloid-like, similar to the case with pure amyloid fractions.

Adhesive Sample Preparation. A lap shear geometry was chosen to test the adhesive strength. Unanodized aluminum flat bar (0.5 in. wide and 0.125 in. thick) was cut into samples 2.5 in. long. A 0.25 in. diameter hole was drilled near the end of the sample. To minimize the effect of varying roughness, samples were sanded at 200 rpm first using P1200 and then P4000 grit sandpaper on a Struers Labosystem. Samples were sonicated in deionized water for 30 min and rinsed with ethanol before use.

10 µL of protein solution (25% (w/v) β-Lg, 40% BSA, or 50% α-La) was dispensed onto one adherend of the lap shear sample resting on a homebuilt fixture The top adherend was placed with a half-inch overlap and held in place by an aluminum bar. Then, each sample was further secured using individual hand-tightened screws. Lap shear samples were placed in a preheated steaming chamber and cured at 60-90° C. for 90 min. The samples were cooled in the closed steaming chamber overnight before removal to prevent rapid changes in temperature or humidity. Samples were then either placed in a desiccator to dry or submerged in water for 72-96 hr and tested using lap shear. Any samples that fell apart during curing were discarded, but samples which broke during equilibration were considered to have adhesion strength of 0 MPa. The sample size for lap shear was generally seven tests for each condition, but is explicitly listed in supplemental information along with average force and average area. Samples were reused after testing. The adhesive residue was removed by hand using coarse sandpaper (either P250, P400, or P600), and samples were re-polished using the aforementioned procedure Accelerated water degradation, based on the two-cycle boil test, was performed on samples of BSA cured at 60° C. and 90° C. and for α-La samples cured at 90° C. using the same procedure as above. After removal from the commercial pressure cooker, samples were placed in water for twelve days. The samples were then placed in a 250 mL beaker filled with deionized water at around 65° C. on a hot plate without stirring for four hours. Additional water was added as it evaporated to ensure the lap joint remained submerged over the course of heating. Samples were cooled to room temperature in air and placed back in room temperature water overnight. The following day, the samples were placed in 65° C. water for another four hours, cooled to room temperature in air, and then submerged in room temperature water. Samples were then immediately tested.

Adhesion Testing and Sample Characterization. Lap shear testing was performed on an Instron 68SC-05 (equipped with a 500 N load cell) using homebuilt grips consisting of clevis rod ends. Samples were pulled at a rate of 1.5 mm/min. Wet adhesion samples were tested in a similar manner, but the samples were removed from water just before use, without any drying. The samples were then imaged using a Nikon AZ100 microscope with a 0.5×Apo objective. Using ImageJ, the nominal contact area was calculated from the average of three length and width measurements. Select samples were stained with protein stain (Imperial stain, ThermoFisher Scientific) over multiple cycles with an equivalent time in deionized water until the stain provided visual contrast. Both adherends of a lap shear sample were stained and destained at the same time.

Chemically Triggered Adhesive Preparation. The design consists of a two component system: component A (bovine serum albumin (BSA) or α-Lactalbumin dissolved at 800 mg per 1 mL (80% w/v) water with the inhibitor glycerol) and component B (a curing agent of urea, L-cysteine, benzalkonium chloride (BAC) and/or silica). All solution concentrations are given for the A or B component individually. To make component A, glycerol is first dissolved in water. Then, the water and protein are combined on a rotator plate at 5-10 rpm for at least 24 hours at room temperature until the mixture is homogenous. For component B, urea and L-cysteine are weighed into a beaker. Then the BAC (50% solution in water) is added. Water is added to a set working solution volume (typically 40 mL). The solution is heated at 60° C. while stirring until fully dissolved. At this point, silica is added and the solution is cooled while stirring until solidified. Some solutions required cooling below room temperature to solidify, so these were cooled on ice while stirring. Both components were stored at 4° C. until use.

To make lap shear samples, aluminum (2.5 in. long×0.5 in. wide×0.125 in. thick) strips were cleaned with ethanol before use. Component A and B were brought to room temperature and weighed out with a 1:1 ratio. Since differing amounts of silica (up to 45% of the curing agent) or the inhibitor would drastically alter the ratio of protein to the denaturants and aggregating agents, the weight of silica and glycerol were not counted in this 1:1 ratio. Component A and B were then mixed together by hand until well blended (~1 min). The adhesive was then applied to one aluminum strip in air, and this aluminum strip was then placed in contact with another aluminum strip in a single lap joint geometry of 0.5 in. overlap. The sample was aligned using a custom 3D printed mold.

Three treatments were used for lap shear samples. The first were cured in air for 1 week. The second were cured in air for 24 hr and then submerged in artificial sea water for 1 week. For the third, the mold was placed under artificial sea water with one side of the adhesive joint already. After application of the glue to a dry aluminum strip, the adhesive was pressed in contact with the submerged aluminum. The sample was then left underwater for 1 week with a weight of 50 g placed on the joint for the first 24 hours. In all three treatments, samples were removed from the mold after 24 hours.

Underwater Adhesives Formed by Thermal Trigger

Whey isolate proteins including Bovine Serum Albumin (BSA) and β-Lactoglobulin (β-Lg), were assessed for their thermal transition properties by heating solutions in small plastic tubes and inverting them upon varying time, temperature, and concentration. Proteins all displayed gelation upon exceeding their denaturation temperatures (60-65° C.) when solution concentrations were above 15% w/v, though gels could be formed at lower concentrations at higher temperatures, for example 5% BSA at 100° C. Gels ranged in properties from soft to hard, with the general trend of higher weight percentages yielding harder gels. While gelation may be an indication of curing and amyloid formation, it remains a qualitative indicator of phase properties. To quantitatively measure conversion of soluble proteins to insoluble aggregates and fibrils, cured materials formed by BSA and β-Lg were analyzed by extracting free proteins and oligomers from samples and quantifying their abundance by gel electrophoresis (Polyacrylamide Gel Electrophoresis, PAGE, FIG. 2C). Cured materials were soaked for 48 hrs. in water to release free protein (labelled 'Extract'), and the remaining solid gel is then exposed to a chemical and heat treatment to extract materials that did not convert to amyloids (labelled 'Gel'). Positive controls were performed on pure amyloid samples demonstrating little to no release of monomers when exposed to such breakdown conditions. When weaker BSA materials cured from 40% w/v solutions at lower temperatures were soaked, a larger fraction of free protein was released to water than from the gel material itself. Both at higher percentages and temperatures, where harder gels are formed, this trend is reversed where little to no free protein is extracted from soaking in water and gels themselves release little protein upon exposure to reducing agents, SDS, and sample heating at 95° C. for 1 hr. Quantification of the intensity of free protein bands from PAGE shows clear conversion of soluble and insoluble fractions over a range of conditions.

The results from gelation, SDS-PAGE, SEM, and ATR-FTIR indicate material structure across length scales. To summarize, high temperature curing of β-Lg and BSA solutions at high concentrations produce greater amounts of insoluble material as seen in the SDS-PAGE of extractions, fibrillar microstructure as seen in SEM, and amyloid vibrational modes in ATR-FTIR data not shown). In contrast, lower temperature curing, though still forming gel, produces lower amounts of insoluble material and lower intensity of amyloid FTIR signatures. Taken together, higher temperature curing of β-Lg and BSA converts more of the protein to the amyloid structure than lower temperature curing. For α-La, higher temperature curing forms a greater amount of insoluble aggregates but does not form amyloids.

A cure-in-place method was developed to steam cure solutions and keep adhesive proteins hydrated so they may transition at elevated temperatures as observed in enclosed tubes. Liquid solutions containing proteins were deposited onto aluminum bars in a lap configuration and steamed inside of a temperature controlled pressure cooker under these differing conditions to form different amounts of amyloids. BSA was tested at two conditions, 20% solution at 75° C. and 40% solution at 100° C., while the other proteins were cured at 75° C. Adhesive testing also included additional whey protein materials such as α-Lactalbumin (α-La) using curing conditions similar to BSA and β-Lg. α-La was tested using 50% solutions, and β-Lg was tested using 25% solutions. Examination of steamed β-Lg gels using ATR-IR show a shift from 1626 $cm^{-1}$ in the monomer state to 1619 $cm^{-1}$ in the gel state, indicative of a change in β-sheet structure towards amyloid-like structure (data not shown). For an assessment of how formulations withstand underwater conditions, lap samples were submerged in water for up to one week before mechanical testing.

Figure 3A:
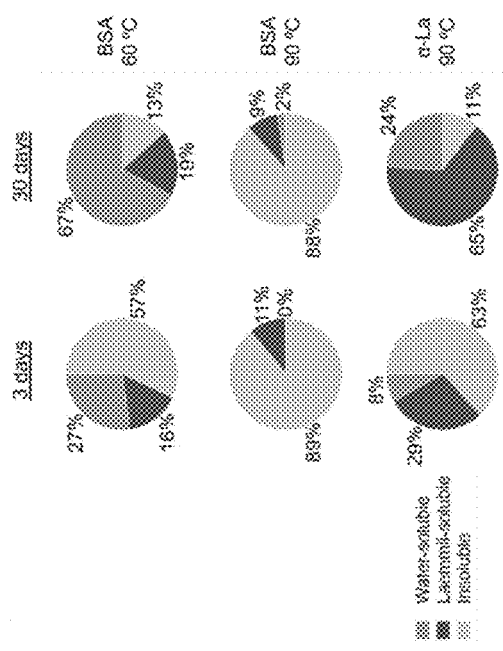
FIGS. 3A and 3B show data on gel degradation and adhesion under accelerated degradation conditions.
Figure 3B:
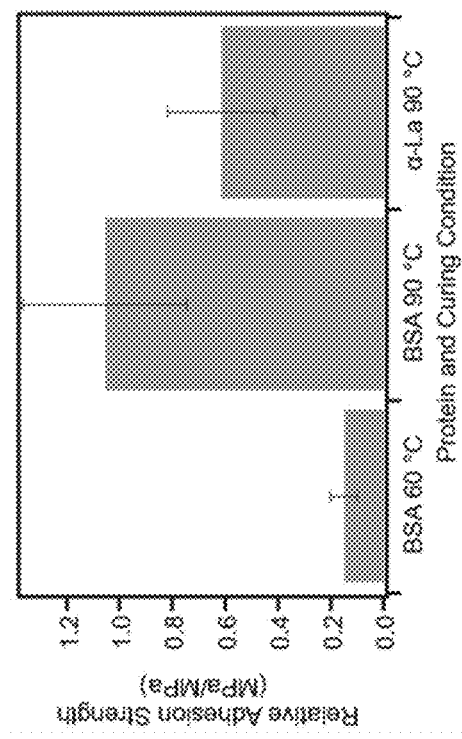

Lap shear testing (FIGS. 3A, 3B) of formulations and curing conditions demonstrate that in situ steam curing of whey isolate proteins are viable methods to produce strong adhesives that can withstand long periods of submersion underwater. Control samples consisting of the same weight percent solutions cured at room temperature and at high temperatures without steam exhibit adhesive bond strengths that were not detectable by tensile testing. Samples that were steam cured and subsequently dried exhibit high adhesion strengths of 3-5 MPa across various proteins studied, while submerged samples retain strong adhesion values of 0.5-1.0 MPa meeting or exceeding commercial marine adhesive performance (Marine Loctite, ~0.5 MPa, 3M Marine, ~0.25 MPa, JB Water Weld, ~0.15 MPa)[26] and comparable to state-of-the-art protein-based underwater adhesives in the literature. 27 The dry adhesive strength of steam cured BSA approaches that of cyanoacrylate-based adhesives (3-5 MPa). Protein gels cured at low and high temperatures were submerged in water for up to one month (FIG. 3A). BSA cured at 90° C. remains highly insoluble after one month in water (0% vs 2% protein loss in water), while 27% of BSA gel cured at 60° C. dissolves in water after 3 days and 67% after 30 days. After one month in water, the water-soluble fraction of α-La cured at 90° C. increases from 8% to 24%. However, α-La does not become completely water-soluble, with the majority (65%) solubilizing only after Laemmli dissolution. The amyloid-rich β-Lg cured at the same temperature loses some amount of protein in water after 30 days, but retains a larger fraction than the non-amyloid α-La gel. To measure durability of adhesives, we submerge lap shear samples for twelve days in water followed by two four-hour cycles in water at 65° C. over the course of two days, based on the two-cycle boil test. After exposure, samples are mounted and bond strength is measured. BSA samples cured at 90° C. were still able to retain full adhesion strength in heated water (0.55±0.30 MPa), similar to the previous short-term results without conditioning. BSA cured at 60° C. showed a dramatic decrease in adhesion strength after accelerated degradation (0.11±0.04 MPa), retaining less than 20% of its initial short-term wet adhesion. The adhesion strength for α-La dropped nearly in half upon long-term soaking and heating (0.25±0.12 MPa).

Figure 4:
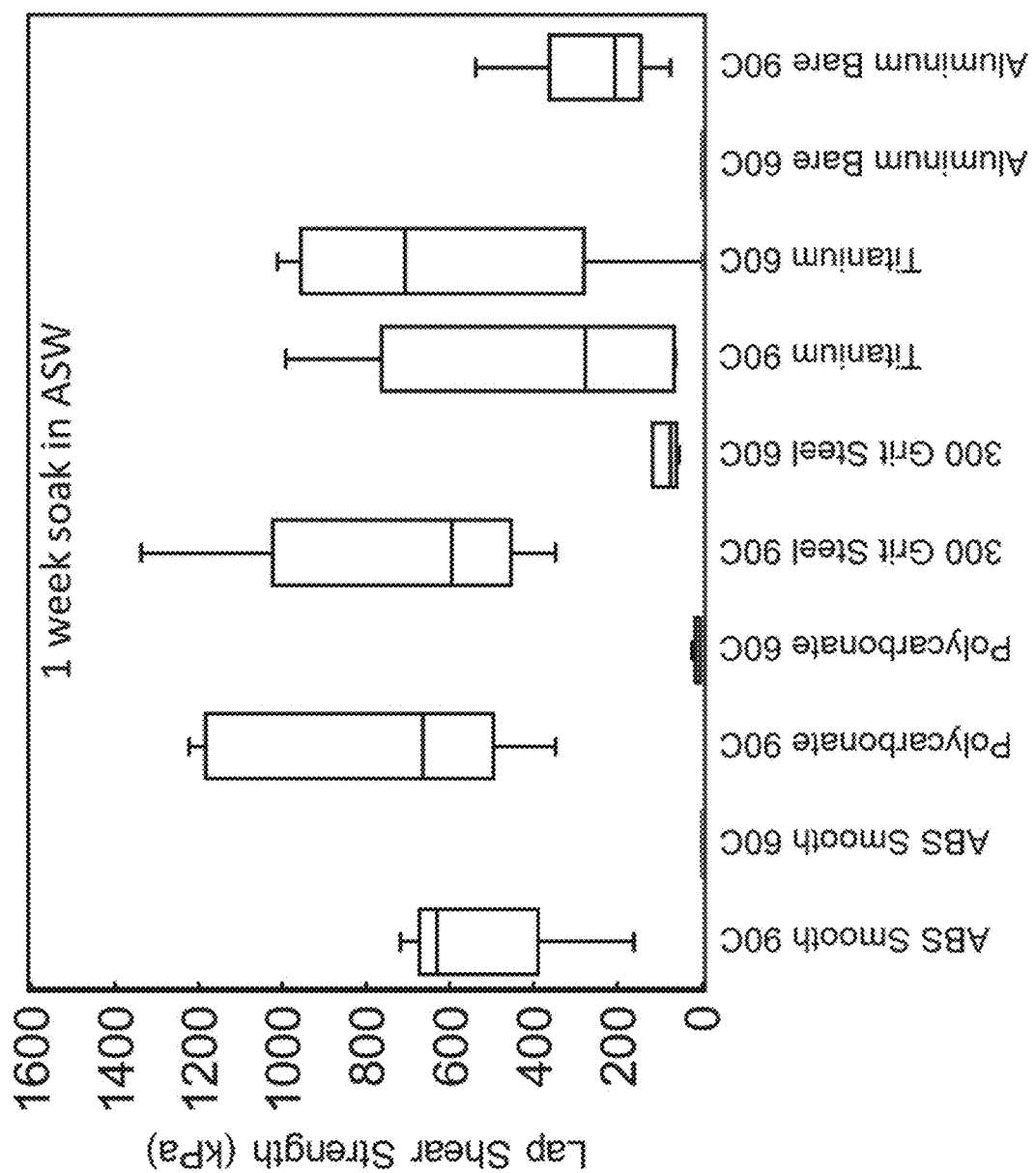
FIG. 4 shows lap shear strength of heat triggered protein adhesive on ABS, polycarbonate, steel, titanium, and aluminum with highest bond strengths when amyloid aggregates are formed at 90° C. Overall bond strengths for non-amyloid protein aggregates at 60° C. were below 100 kPa, with the exception of titanium.

Generally, protein materials converted to amyloids demonstrate significant improvements in underwater adhesion across material systems (FIG. 4). Bond strengths measured across polymers and metals after one week submersion in seawater yielded values between 0.5 and 1.5 MPa when converted to amyloid state. Samples heated at lower temperatures with no amyloid conversion, yielded bond strengths that remained below 100 kPa with the exception of titanium. These data indicate that conversion to amyloid materials via thermal treatment leads to strong and durable underwater adhesive properties.

Underwater Adhesive Formed by Chemical Trigger

Figure 5C:
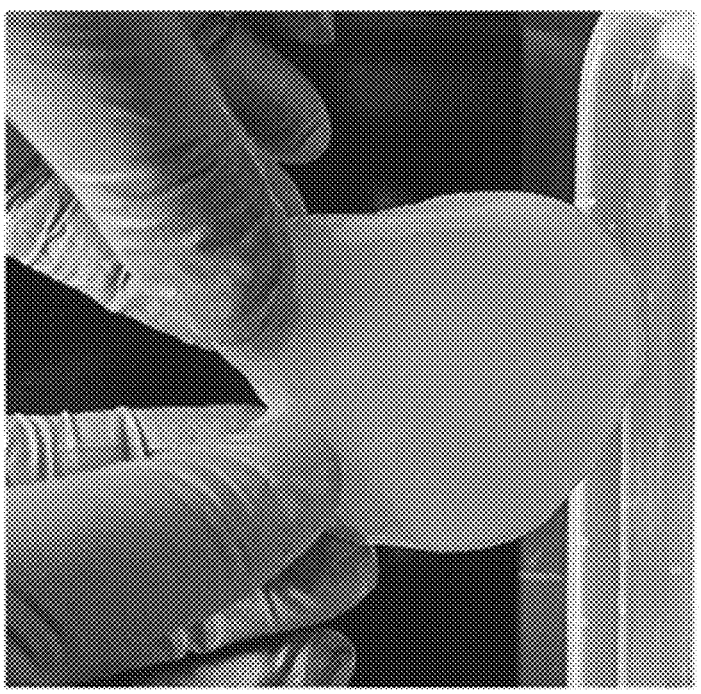
FIGS. 5A-5C characterize the effect of multicomponent curing agent on properties of protein materials.
Figure 5B:
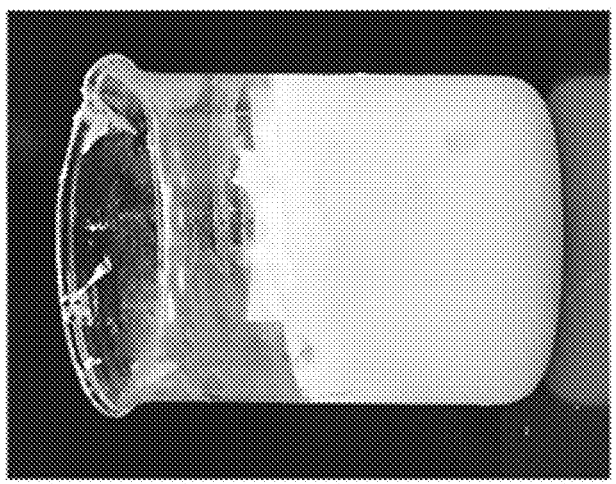
Figure 5A:
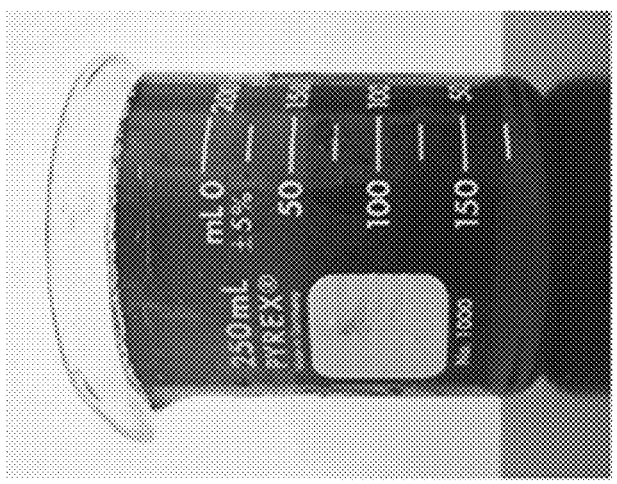

Chemical triggers were used to develop saltwater curing materials using commercial off-the-shelf (COTS) proteins which can be delivered as a liquid to cure at room temperature and form a hard, rubbery coating (FIGS. 5A-5C). Materials that cure and operate underwater require key properties for their application and long-term durability. As a liquid, they are preferably denser than water and negatively buoyant. Upon deposition to the surface, the liquid should resist sagging and keep its shape yet remain spreadable so as to not thin out and dilute. Curing should be rapid, to minimize water infiltration to the application site and swelling or weakening of the material. The final cured product is preferably hard and durable, and should maintain a high modulus (MPa range). In other words, the material must be capable of spanning significant viscosity and modulus during deployment and operation.

Surfactant and certain surfactant chemistries that contain aliphatic components can tune viscosity and phase properties of the delivered solution. Introduction of a greasy surfactant (BAC) to protein solutions both allowed the liquid to retain shape and also significantly reduce the time to set into a rigid gel. BAC enables the material to keep its shape but can tune viscosity to span from a low viscosity (0.1-2% w/v: 150-200 cps) to materials that resist flow (2.5-5% w/v: 70,000-150,000 cps). The surfactant plays a synergistic effect with the denaturant, which is a combination of urea and a sulfur-containing reducing compound. Urea initiates protein aggregation through competition of backbone hydrogen bonds that hold proteins together, disrupting their stability. Protein cross-linking in the form of disulfide bonds can impede denaturation and the aggregation processes, so sulfur-containing reducing agents are necessary as part of the denaturant. Reducing agent concentrations are used which only reduce about half of the total number of disulfide bonds to promote intermolecular disulfide bonding during protein aggregation. With both urea and reducing agent at their highest concentration, total cure time remained high. Thus, adding surfactant is synergistic and further enhances viscosity and cure time to meet the application requirements.

Figure 6:
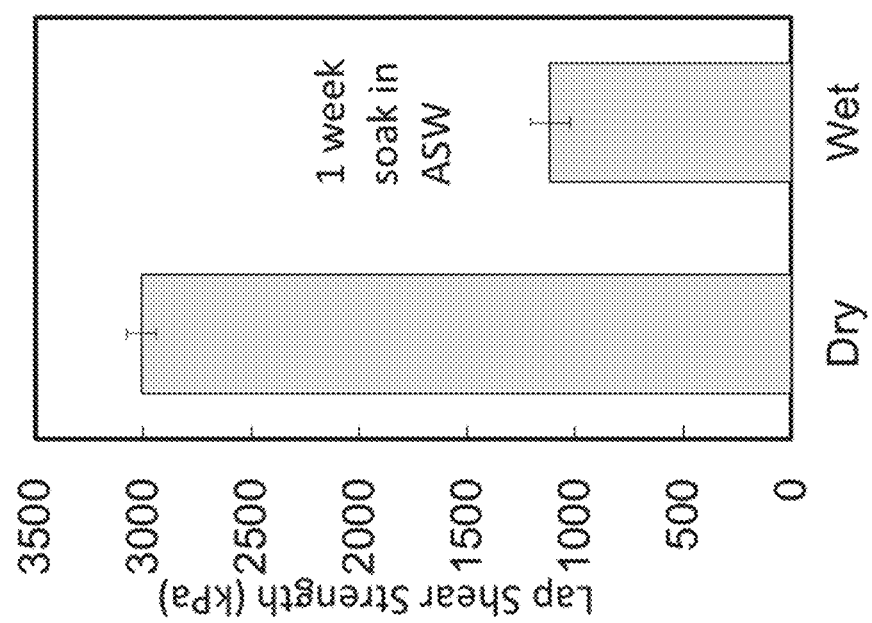
FIG. 6 shows lap shear strength of chemically cured protein adhesive, both applied dry and applied underwater. Dry samples were left to cure over 48 hrs., while wet samples were soaked in artificial sea water (ASW) for 1 week prior to tensile testing.
Figure 7A:
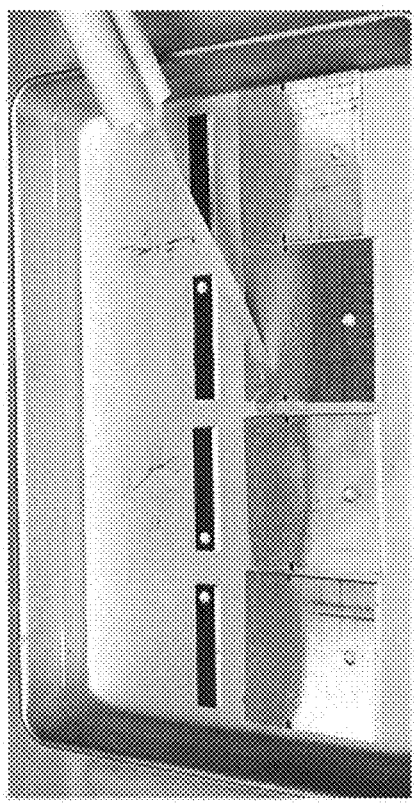
FIGS. 7A and 7B are photographs showing practical deployment of adhesive underwater.
Figure 7B:
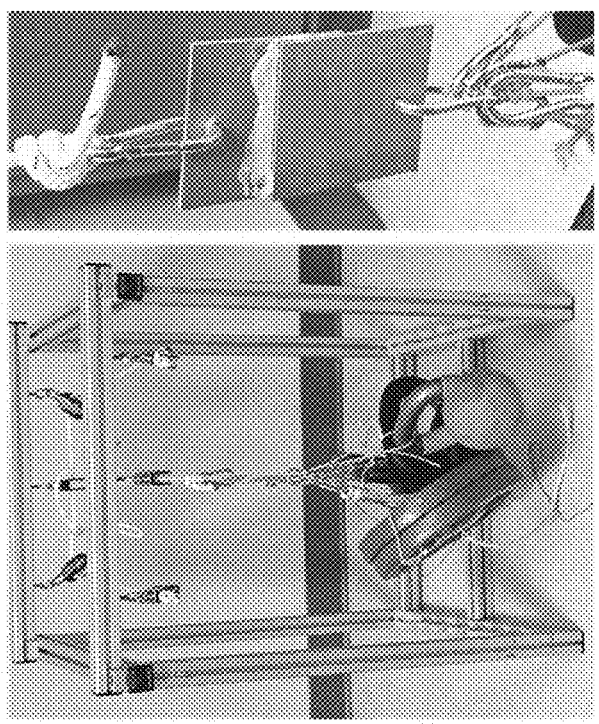
Figure 8:
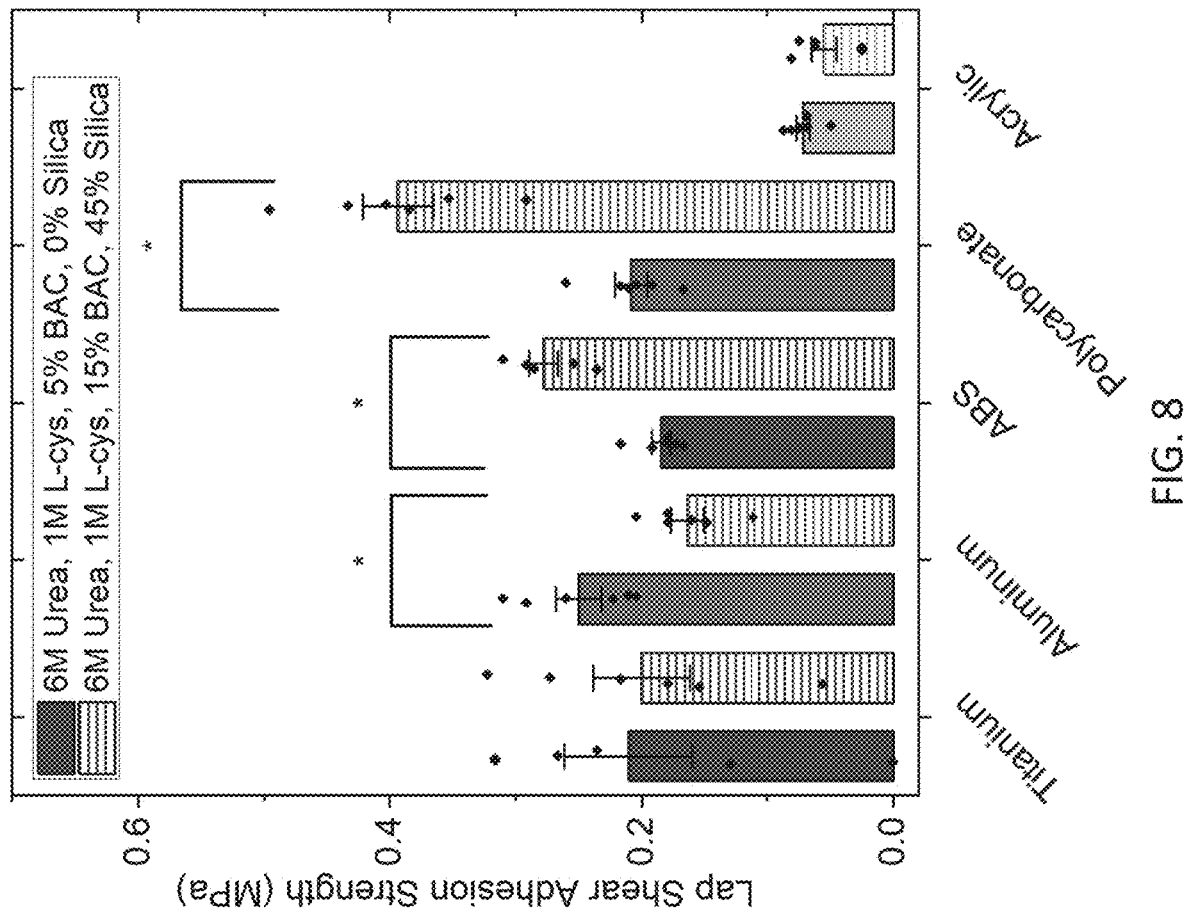
FIG. 8 shows the effect of substrate and formulation on adhesive strength. Lap shear adhesion strength on various materials sanded with 300 grit sandpaper was measured after 1 week conditioning in ASW. Error bars represent standard error. Asterisks indicate a statistical difference ($p<0.05$) between formulations for a given substrate using a t-test.

Protein-based materials developed fulfil many property requirements to operate as saltwater curing materials. Protein solutions at around 40% w/v and above exhibit negative buoyancy, and keep their shape when mixed with the proper cure initiating components. These materials operate when two components are combined, one part containing a high loading (e.g., 80% w/v) of protein in water and a second component that initiates denaturation and aggregation. The initiator component contains a high concentration of protein denaturant (urea, guanidine hydrochloride, etc.), sulfur-containing reducing agent (mercaptoethanol, dithiothreitol, or cysteine) and surfactant (quaternary ammonium, detergent, and/or lipids). The two components can stored separately in a standard two-part epoxy gun and deployed through a mixing nozzle directly underwater. These separate solutions can be stored for extended periods of time without significant effect on curing performance. The shelf storage lifetime of these materials was tested and confirmed to be at least one month. Lap shear testing of chemically triggered protein adhesives yield 2-3 MPa strengths in air and 0.5-1.0 MPa when applied and submerged for a week in seawater (FIG. 6). These strengths match and exceed previous steam cured adhesive properties, and are comparable to other bioinspired underwater adhesives in the literature. Chemically triggered protein adhesives generally show an increase in adhesion to materials with the inclusion of silica (FIG. 8).

Figure 9:
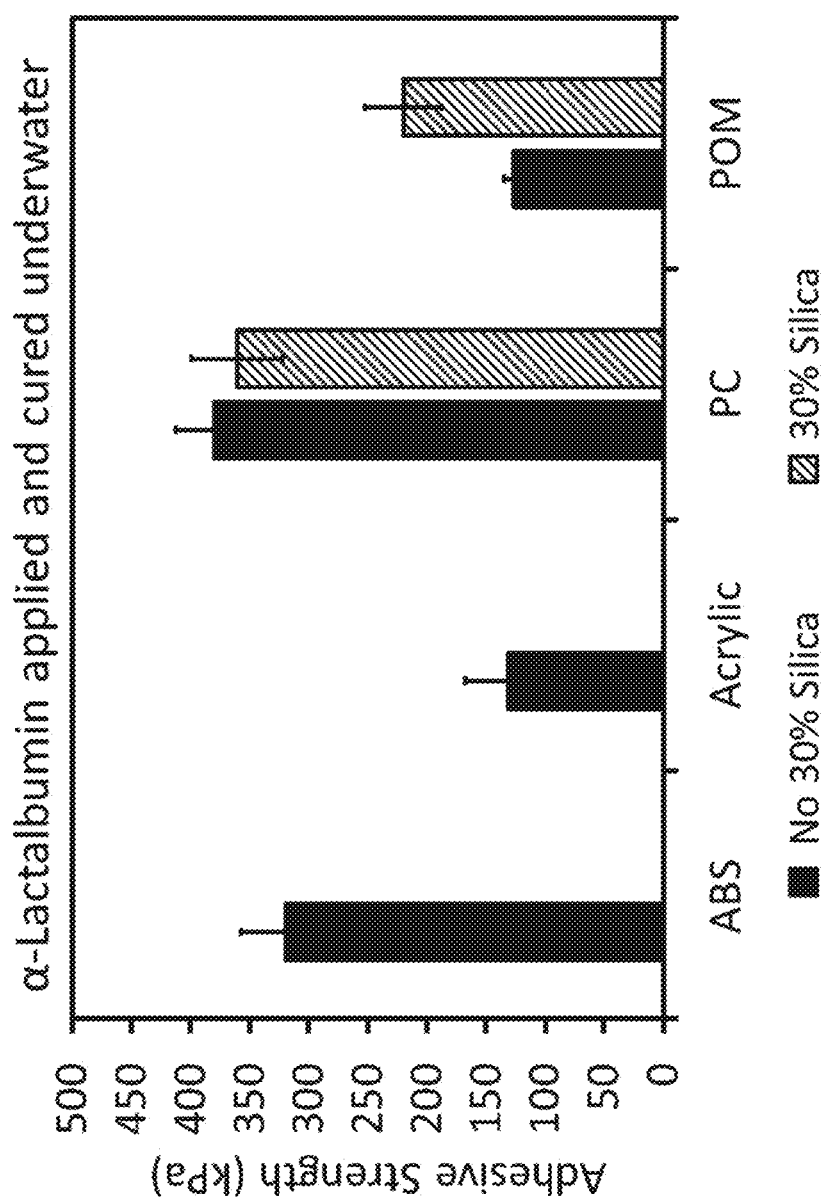
FIG. 9 provides data from lap shear testing of chemically triggered α-Lactalbumin (α-La) underwater adhesive applied and cured in artificial seawater. The formulation after mixing was 40% w/v α-La, 3M Urea, 5% w/v BAC, 0.5M L-cysteine. Samples were cured underwater for 7 days prior to lap shear testing.

Protein chemistry and density determine both the viscosity of the fluid and the ultimate hardness of the cured material. Pure proteins such as Bovine Serum Albumin (BSA), α-Lactalbumin (α-La) and β-Lactoglobulin (β-Lg) were investigated at various percentages and were found to affect the viscosity of the initial deployed fluid. BSA was found to have the greatest impact on both viscosity and ultimate hardness of the cured material. B-Lg was identified as another protein of interest due to its ability to solidify to a similar hardness as BSA, however was found to adhere to surfaces more weakly. α-La was found to solidify to a similar hardness as BSA. When chemically triggered as described above, α-La was found to maintain similar bonding as BSA in underwater adhesion tests (FIG. 9), demonstrating the generality of this approach. Trends seen in chemical curing of these three proteins were similar to those observed in heat curing. Protein mixtures isolated from plants such as soybeans, wheat, peas as well as whey proteins derived from the dairy process were also explored to determine their ability to perform as saltwater curing materials. These materials currently cost approximately \$0.02/gram, making them attractive for gallon-scale production of coating materials. Of the four, pea protein concentrate (PPC) and whey protein isolate (WPI) could be loaded into water at 80% w/v which makes them ideal to replace pure BSA or B-Lg proteins. When mixed with the standard initiator formulation, WPI performed with similar viscosity, cure times, and final material hardness as pure protein solutions. PPC also solidified but formed a compliant material with a longer cure time.

ADVANTAGES AND FURTHER EMBODIMENTS

The techniques described herein provide scalable underwater adhesives at much lower cost than alternatives. Yet lower-cost agricultural protein mixtures are compatible with these techniques and their use is also contemplated.

These methods are not limited to those resulting in amyloid formation, as adhesion can occur via other types of protein aggregation.

CONCLUDING REMARKS

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

REFERENCES

1. Waite, J. H.; Tanzer, M. L., Polyphenolic substance of Mytilus *edulis*: novel adhesive containing L-dopa and hydroxyproline. *Science* 1981, 212 (4498), 1038-1040.

2. Stewart, R. J.; Wang, C. S., Adaptation of caddisfly larval silks to aquatic habitats by phosphorylation of H-fibroin serines. *Biomacromolecules* 2010, 11 (4), 969-974.
3. Singla, S.; Amarpuri, G.; Dhopatkar, N.; Blackledge, T. A.; Dhinojwala, A., Hygroscopic compounds in spider aggregate glue remove interfacial water to maintain adhesion in humid conditions. *Nature communications* 2018, 9 (1), 1-8.
4. Stewart, R. J.; Wang, C. S.; Song, I. T.; Jones, J. P., The role of coacervation and phase transitions in the sandcastle worm adhesive system. *Advances in colloid and interface science* 2017, 239, 88-96.
5. Chapman, M. R.; Robinson, L. S.; Pinkner, J. S.; Roth, R.; Heuser, J.; Hammar, M.; Normark, S.; Hultgren, S. J., Role of *Escherichia coli* curli operons in directing amyloid fiber formation. *Science* 2002, 295 (5556), 851-855.
6. Mackay, J. P.; Matthews, J. M.; Winefield, R. D.; Mackay, L. G.; Haverkamp, R. G.; Templeton, M. D., The hydrophobin EAS is largely unstructured in solution and functions by forming amyloid-like structures. *Structure* 2001, 9 (2), 83-91.
7. Barlow, D. E.; Dickinson, G. H.; Orihuela, B.; Kulp III, J. L.; Rittschof, D.; Wahl, K. J., Characterization of the adhesive plaque of the barnacle Balanus amphitrite: amyloid-like nanofibrils are a major component. *Langmuir* 2010, 26 (9), 6549-6556.
8. Zhong, C.; Gurry, T.; Cheng, A. A.; Downey, J.; Deng, Z.; Stultz, C. M.; Lu, T. K., Strong underwater adhesives made by self-assembling multi-protein nanofibres. *Nature nanotechnology* 2014, 9 (10), 858.
9. Knowles, T. P.; Oppenheim, T. W; Buell, A. K.; Chirgadze, D. Y; Welland, M. E., Nanostructured films from hierarchical self-assembly of amyloidogenic proteins. *Nature Nanotechnology* 2010, 5 (3), 204-207.
10. Peydayesh, M.; Suter, M. K.; Bolisetty, S.; Boulos, S.; Handschin, S.; Nyström, L.; Mezzenga, R., Amyloid fibrils aerogel for sustainable removal of organic contaminants from water. *Adv Mater* 2020, 32 (12), 1907932.
11. Hu, X.; Tian, J.; Li, C.; Su, H.; Qin, R.; Wang, Y; Cao, X.; Yang, P., Amyloid-Like Protein Aggregates: A New Class of Bioinspired Materials Merging an Interfacial Anchor with Antifouling. *Adv Mater* 2020, 32 (23), 2000128.
12. Cui, M.; Wang, X.; An, B.; Zhang, C.; Gui, X.; Li, K.; Li, Y.; Ge, P.; Zhang, J.; Liu, C., Exploiting mammalian low-complexity domains for liquid-liquid phase separation-driven underwater adhesive coatings. *Science advances* 2019, 5 (8), eaax3155.
13. Bolisetty, S.; Arcari, M.; Adamcik, J.; Mezzenga, R., Hybrid amyloid membranes for continuous flow catalysis. *Langmuir* 2015, 31 (51), 13867-13873.
14. Shimanovich, U.; Efimov, I.; Mason, T. O.; Flagmeier, P.; Buell, A. K.; Gedanken, A.; Linse, S.; Åkerfeldt, K. S.; Dobson, C. M.; Weitz, D. A., Protein microgels from amyloid fibril networks. *Acs Nano* 2015, 9 (1), 43-51.
15. Lutz-Bueno, V.; Bolisetty, S.; Azzari, P.; Handschin, S.; Mezzenga, R., Self-Winding Gelatin-Amyloid Wires for Soft Actuators and Sensors. *Adv Mater* 2020, 32 (48), 2004941.
16. Jansens, K. J.; Lambrecht, M. A.; Rombouts, I.; Monge Morera, M.; Brijs, K.; Rousseau, F.; Schymkowitz, J.; Delcour, J. A., Conditions governing food protein amyloid fibril formation—Part I: Egg and cereal proteins. *Comprehensive reviews in food science and food safety* 2019, 18 (4), 1256-1276.
17. Lambrecht, M. A.; Jansens, K. J.; Rombouts, I.; Brijs, K.; Rousseau, F.; Schymkowitz, J.; Delcour, J. A., Conditions governing food protein amyloid fibril formation. Part II: Milk and legume proteins. *Comprehensive reviews in food science and food safety* 2019, 18 (4), 1277-1291.
18. Cao, Y.; Mezzenga, R., Food protein amyloid fibrils: Origin, structure, formation, characterization, applications and health implications. *Advances in colloid and interface science* 2019, 269, 334-356.
19. Matthews, M., Whey protein recovery processes and products. *Journal of Dairy Science* 1984, 67 (11), 2680-2692.
20. Karbasi, M.; Sanchez-Ferrer, A.; Adamcik, J.; Askari, G.; Madadlou, A.; Mezzenga, R., Covalent β-lactoglobulin-maltodextrin amyloid fibril conjugate prepared by the Maillard reaction. *Food Chemistry* 2021, 342, 128388.
21. Wang, G.; Liu, N.; Guo, M., Use of whey protein as a natural polymer for tissue adhesive: Preliminary formulation and evaluation in vitro. *Polymers* 2018, 10 (8), 843.
22. Wang, G.; Zhang, T.; Ahmad, S.; Cheng, J.; Guo, M., Physicochemical and adhesive properties, microstructure and storage stability of whey protein-based paper glue. *International Journal of Adhesion and Adhesives* 2013, 41, 198-205.
23. Roberts, A.; Finnigan, W; Kelly, P.; Faulkner, M.; Breitling, R.; Takano, E.; Scrutton, N.; Blaker, J.; Hay, S., Non-covalent protein-based adhesives for transparent substrates—bovine serum albumin vs. recombinant spider silk. *Materials Today Bio* 2020, 7, 100068.
24. Roman, J. K.; Wilker, J. J., Cooking chemistry transforms proteins into high-strength adhesives. *J Am Chem Soc* 2018, 141 (3), 1359-1365.
25. Paulsson, M.; Hegg, P. O.; Castberg, H. B., Heat-induced gelation of individual whey proteins a dynamic rheological study. *Journal of Food Science* 1986, 51 (1), 87-90.
26. North, M. A.; Del Grosso, C. A.; Wilker, J. J., High Strength Underwater Bonding with Polymer Mimics of Mussel Adhesive Proteins. *ACS Appl Mater Interfaces* 2017, 9 (8), 7866-7872.
27. Brennan, M. J.; Kilbride, B. F.; Wilker, J. J.; Liu, J. C., A bioinspired elastin-based protein for a cytocompatible underwater adhesive. *Biomaterials* 2017, 124, 116-125.

What is claimed is:

1. A method of forming an adhesive bond underwater, the method comprising:
   providing a first component comprising between 25 and 100% w/v (weight/volume) bovine serum albumin, b-lactoglobulin, and/or a-lactalbumin in water;
   providing a second component comprising 6-10M of a protein denaturant, 0.8-1.2M of a sulfur-containing reducing agent, 5-15% w/v of charged surfactant, and 10-45% w/v hard filler material;
   mixing the first and second components in a volumetric ratio in the range of 0.5:2 to 2:0.5 and contacting them with a first surface underwater; and then
   contacting the mixed components with a second surface underwater thereby forming an adhesive bond between the surfaces.

2. The method of claim 1, wherein the protein denaturant is urea, the sulfur-containing reducing agent is cysteine, and the charged surfactant is benzalkonium chloride.

3. The method of claim 2, wherein said components are mixed in a volumetric ratio of about 1:1.

* * * * *